Fig. 1

Jan. 11, 1955   J. M. MERGEN ET AL   2,699,220
PROPELLER AND CONTROL SYSTEM THEREFOR
Filed June 24, 1948   7 Sheets-Sheet 3

INVENTOR.
JOSEPH M. MERGEN
ROBERT K. TIEDEMAN
BY Godfrey B. Speir
ATTORNEY.

Jan. 11, 1955   J. M. MERGEN ET AL   2,699,220
PROPELLER AND CONTROL SYSTEM THEREFOR
Filed June 24, 1948                                        7 Sheets-Sheet 4

INVENTOR.
JOSEPH M. MERGEN
ROBERT K. TIEDEMAN
BY
ATTORNEY.

United States Patent Office 2,699,220
Patented Jan. 11, 1955

2,699,220

PROPELLER AND CONTROL SYSTEM THEREFOR

Joseph M. Mergen, Verona, and Robert K. Tiedeman, Packanack Lake, N. J., assignors to Curtiss-Wright Corporation, a corporation of Delaware Application June 24, 1948, Serial No. 34,984

14 Claims. (Cl. 170—160.35)

This invention relates to propellers for aircraft and is concerned essentially with the provision of a new type of controllable pitch aircraft propeller and a control and pitch changing system therefor.

An important problem in the design and construction of aircraft propellers is to provide power units for effecting pitch changes therein, having sufficient power to cause pitch change at high rates, concurrently with flexibility to attain rates of pitch change of very low value, the power unit being capable of a smooth transition in rate of pitch change through all ranges needed. The range of the system must likewise be great to enable feathering and reverse pitch of the propeller and to provide safety and auxiliary features to give the scope of operation in the propeller which is expected with present day power plants for aircraft. These very briefly summarized requirements for modern propellers must be fulfilled with a minimum expenditure of weight and complication in the system. It is appreciated that numerous attempts have been made to fill the requirements noted, some with more than a moderate amount of success; but opportunities for further simplification and weight reduction are always present.

It is an object of this invention to provide a propeller and control system whose flexibility of operation is great and whose complexity and weight is minimized. Another object of the invention is to provide a propeller pitch changing power unit, a driving mechanism for the power unit, and a drive from the power unit to the propeller which will yield any reasonable rate of pitch change desired with a minimum of lag in the system, a propeller embodying a power unit having characteristics of this sort being particularly adapted for use in conjunction with gas turbines. It is a further object of the invention to incorporate a close coupled hydraulic pump and motor system as the power unit in a pitch changing mechanism, wherein the pump or motor has variable displacement so that varying rates of pitch change may be secured and so that a wide range of pitch may be attained as for instance from the feathering condition of about 90° positive pitch to a reverse pitch of about —20° or—30°. It is a further object of the invention to incorporate a relatively low power standby independently operated power unit for the propeller pitch change system operable to finally feather or initially unfeather a propeller, or to change propeller pitch under static conditions where the normal operating pitch changing power of the propeller is derived from rotation of the propeller itself—that is from power available in the propeller driving prime mover. It is a further object of the invention to incorporate a system for automatically switching the standby pitch changing power unit into operation in lieu of the normal pitch changing power unit and vice versa without requiring separate control action on the part of the aircraft crew.

It is another object of the invention to provide a control system in a propeller wherein the primary control for the propeller calls for blade angle and wherein the propeller incorporates a servo system to obtain a called-for blade angle at maximum rate of pitch change consistent with operating conditions, commonly called beta or blade angle control. Another object is to provide a rate of pitch change control system wherein the propeller control calls for a high or low rate of pitch change in either direction in accordance with operating conditions or in accordance with control demands made by a separate control instrumentality which may form a portion of the power plant system.

A further object of the invention is to provide a propeller which is self-contained as to all of its driving and functional elements so that it may be installed and serviced as a mechanism independent of other mechanisms forming part of a power plant system.

The above objectives, along with others, will become apparent in reading the annexed detailed description in connection with the claims and drawings. Only the claims are to be depended upon for defining the limits of the invention. The drawings and associated description are only to be considered as exemplary in outlining suitable structures in which the invention is embodied.

Reference may now be made to the drawings in which similar reference characters indicate similar parts and in which.

Description of propeller proper

Figure 1:
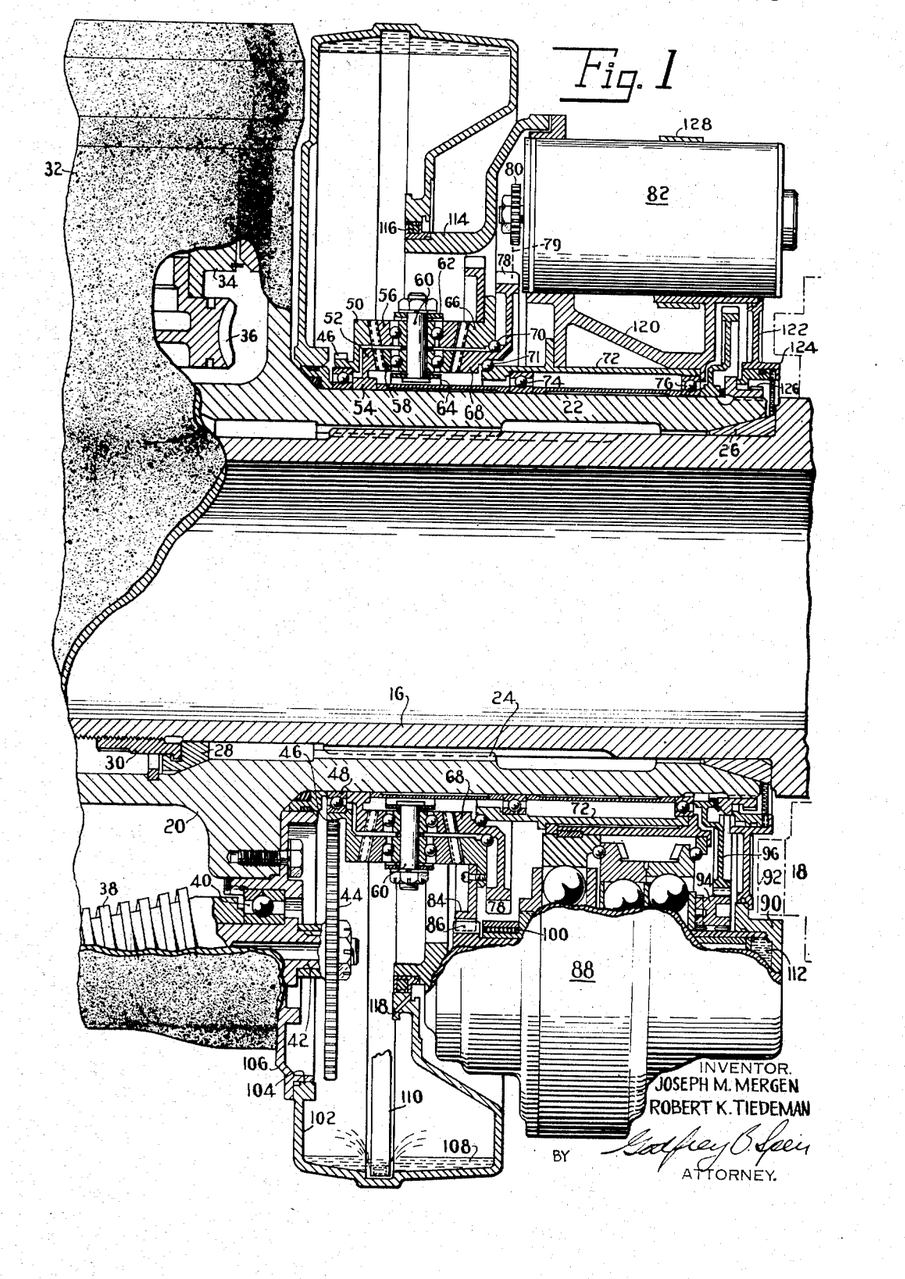
Fig. 1 is a longitudinal section through a portion of a propeller according to the invention.
Figures 2, 3:
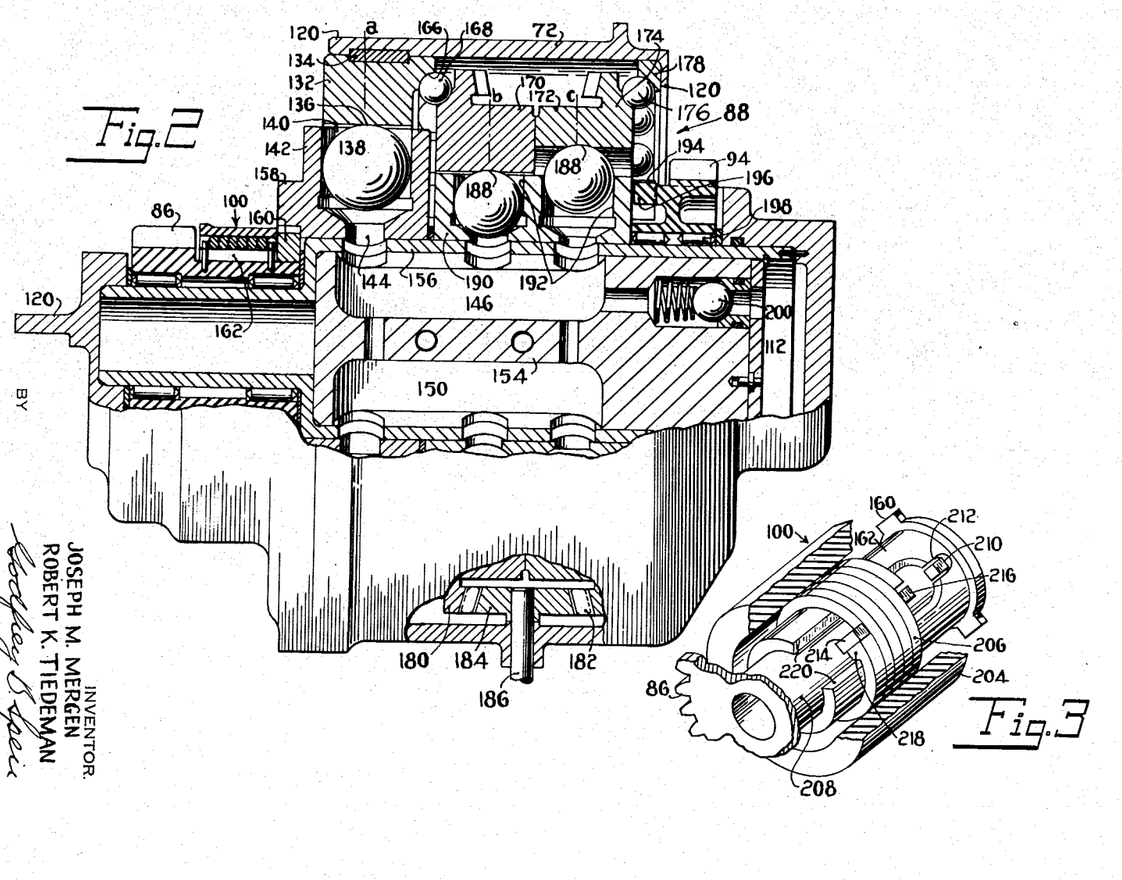
Fig. 2 is an enlarged longitudinal section, partly broken away, showing the hydraulic pump and motor power unit for effecting propeller pitch change.
Fig. 3 is a fragmentary perspective elevation of a portion of the mechanism of Fig. 2.

Reference may first be made to Figs. 1 and 2 for an appreciation of the basic propeller structure and power unit system comprising the invention, initial reference being had to Fig. 1. Therein, we show a propeller shaft 16 extending leftwardly as shown from a power plant 18, this shaft being coupled in any desired manner to the driving elements of the power plant which might comprise a gas turbine, a reciprocating engine, or other preferred form of prime mover. A propeller hub 20, having a rearward cylindrical extension 22 embracing the shaft 16, is drivably splined to the shaft as at 24, and is held concentric therewith in the usual manner by conical centering washers, the rear one being shown at 26 and forward one at 28 in conjunction with a propeller hub securing nut 30. The hub comprises blade sockets 32 of any appropriate number, the present invention disclosing a four-way hub to carry four propeller blades. The blades such as 34 are secured in the hub sockets in suitable bearings, each being provided at its inner end with a worm wheel 36 engaged by a worm 38 carried in bearings such as 40 in the hub. The shaft 42 of each worm 38 extends through the rear of the hub, parallel to and spaced from the hub axis and is driven by a blade gear 44 mounted thereon, all said blade gears being coplanar. The several gears 44 of which only one is shown, it being understood that there is one such gear for each blade, mesh with a drive gear 46 embracing and borne for rotation on and relative to the rear hub extension 22 on a bearing 48, the gear 46 having formed as part thereof an outer outboard bevel gear 50. An inner outboard bevel gear 52 is nested within the gear 50 and is secured to the propeller hub extension 22 for rotation therewith, as at 54. Meshing with the bevel gears 50 and 52 are a plurality of sets of beveled planet pinions 56 and 58 respectively, each set of planet pinions being coaxial and being carried on a spider shaft 60, the several spider shafts being secured to bands 62 and 64 embracing and lying within, respectively, the several sets of bevel pinions 56 and 58. The outboard teeth of the pinions 56 and 58 engage the outboard gears 50 and 52. The inboard teeth of the pinions respectively engage two bevel gears 66 and 68, the gear 66 being designated the outer inboard bevel gear and the gear 68 being designated the inner inboard bevel gear. These gears are secured on bearings 70 and 71 in a housing structure 72 embracing the rear hub extension 22 and piloted thereon through bearings 74 and 76.

The inner inboard gear 68 is provided with a spur gear 78 drivably engaged through a gear train not shown but indicated by a dash line 79, with a driving gear 80 of an electrical motor 82. The electric motor as will be noted hereinafter, is provided with a magnetic brake so that under normal operating conditions, the electric motor driving element is held stationary, thereby anchoring the gear 78 and its inner inboard bevel gear 68 against rotation. The outer inboard bevel gear 66 is provided with a spur gear 84, engaged with a driving pinion 86 of a hydraulic pump and motor power unit designated in its entirety by the reference character 88. The unit 88 is mounted upon the housing 72, this housing being held from rotation with the propeller by engagement of a portion thereof such as 90 with a projection 92 on the nose of the prime mover 18. The unit 88 is provided with an input gear 94 engaged with a driving gear 96 embracing and rotatable with the propeller hub rear extension 22, which in turn rotates with the propeller shaft 16.

Let it be assumed, pending the detailed description following, that the unit 88 comprises a variable displacement hydraulic pump and a close coupled hydraulic motor driven by the pump. Propeller shaft driven gear 96 drives the pump gear 94 thereby, when the pump is adjusted to deliver fluid, providing fluid to the motor of the unit 88, the output from the motor being delivered from the motor pinion 86 to the gear 84 thereby driving the outer inboard bevel gear 66 at some finite speed. If the pump output is zero, the motor pinion 86 and the gear 84 are stationary.

The elements 50, 52, 56, 58 and 66, 68 comprise an intergearing to transmit pitch changing motion from the stationary (relative to the aircraft) pitch changing motor to the rotating propeller blades. Their action is as follows: When the gear 68 is held stationary, the gear 52 rotating at propeller speed, the spiders 60 are constrained to rotate about the propeller shaft axis at half propeller speed due to the engagement of the pinions 58 with the gears 68 and 52. Now if no rotary motion be imparted to the gear 66, the outer outboard bevel gear 50 will be constrained to rotate at propeller speed with the gear 52. If, however, rotation is imparted to the gear 66 either in advance of or in retard of the gear 68, similar advancing and retarding rotation, with respect to propeller speed, will be imparted to the gear 50. Such rotative motion of the gear 50 is then transmitted to the drive gear 48 and the blade gears 44 to cause pitch changing rotation of the propeller blades through the worm and wheel connection 38, 36.

If it be assumed that operation of the power unit 88 has ceased for any reason, the output gear 86 of the motor of the unit 88 is anchored against rotation by the interposition of a bi-directional no-back brake 100 which will be described. Now, it may be assumed that the electric motor 82 may be utilized to effect blade pitch change. The outer inboard bevel gear 66 locked through gear 84 to the pinion 86 now becomes the anchor gear for the transfer gearing and, through the pinion 56 meshed therewith, and the pinion 58 constrained to travel about the propeller shaft with the pinion 56, and engagement of the pinion 58 with the propeller speed bevel gear 52, the planet carrier 60 is constrained to travel at half propeller speed. Now, if the inner inboard bevel gear 68 is rotationally advanced or retarded relative to the anchor gear 66, as by operation of the electric motor 82 in either direction, pitch changing movement will be imparted through the pinions 58 and 56 to the outboard outer bevel gear 50 and thence, in the manner previously described, to the propeller blades. When pitch changing movement is caused by the motor 82, the spiders 60 rotate about the propeller shaft at a controlled speed differing slightly from half propeller speed.

Thus, either inboard bevel gear 66 or 68 may become an anchor gear while the other may become a pitch changing driving gear according to whether the pitch changing power unit 82, or 88 is selected for use.

The intergearing system above described is contained within an annular housing 102 secured to the inboard side of the propeller hub, said housing including apertures as at 104 of sufficient size to enable its installation over the blade gears 44. Sub-housings 106 are associated with housing 102 to provide a closure between the blade gears 44 and the propeller hub. The housing 102 further comprises an oil or hydraulic fluid sump and, since the housing rotates with the propeller the fluid therein is hurled to the periphery of the sump as shown at 108, said fluid being pressurized centrifugally. The centrifugally pressurized fluid is utilized to charge the hydraulic power unit 88 through the medium of a scoop 110 having an entrance opening adjacent the periphery of the housing 102, said scoop being connected by means not shown to feed one end of the hydraulic unit 88 as at 112. The propeller system is further provided with an intermediate non-rotating housing 114 with an annular outboard portion which has rotatable sealing engagement with the housing 102 as at 116, the seal at 116 preventing leakage of fluid in the housing and being provided with a drain 118 for the return of fluid seepage to the sump. The housing 114 is secured to another housing portion 120 carrying the power units 82 and 88 and associated control and gear mechanism which are revealed in the schematic figures the portion 120 engaging, and being supported by, the housing 72 piloted on the propeller. The inboard end of the housing portion 120 is provided with a cover 122 having sealing engagement at 124 with an extension 126 secured to the inboard end of the hub extension 22, the cover 122 providing a closure for the gear 96 which serves to drive the power unit 88. Appropriate gaskets, seals and securing devices familiar to the skillful designer are incorporated in the housing system and the structure contained therein at appropriate locations, some of these seals etc. being shown but not being identified particularly by reference characters. It may be further noted that the electric power unit 82 is secured upon the housing portion 120 as by a clamp band 128 so that it may be readily removed should replacement or servicing be required, and so that a more or less standard motor unit of appropriate design may be incorporated in the propeller system.

*Description of hydraulic power unit*

Figures 6A, 6B, 6C, 7:
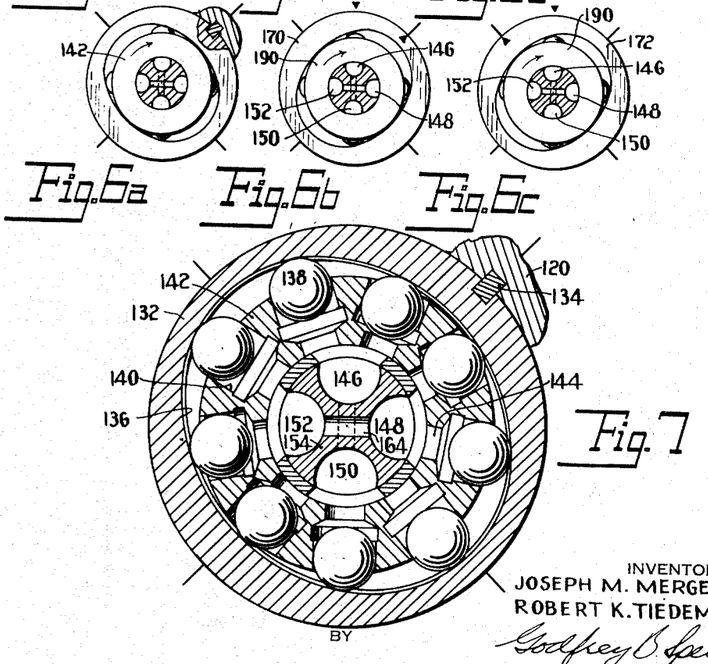
Figs. 6a, 6b and 6c are end elevations of portions of the power unit substantially on the lines a, b and c respectively of Fig. 2 showing the elements adjusted for maximum rate of pitch change in the other direction.
Fig. 7 is an enlarged sectional view of the pump of the power unit shown in Fig. 2, taken substantially on the line a of Fig. 2.

Reference may now be had to Fig. 2 which shows the hydraulic power unit 88 in considerable detail. In this figure, the pump input gear 94 will be recognized at the right hand end of the assembly, and the motor output gear 86 will be recognized at the left hand end of the assembly. The power unit is preferably contained in a portion of the housing component 120. It consists of a motor race 132, externally circular as shown in Fig. 7 and keyed as at 134 against rotation in the housing 120. The inner run of the race 132 is elliptical in form and includes a shallow central groove 136 to provide a raceway for a plurality of hardened balls 138 of steel or equivalent. These balls are reciprocable in individual cylinders 140 formed radially in a rotatable ball carrier 142, each cylinder communicating at its inner end with a radial passageway 144 through which hydraulic liquid may enter or leave the cylinder from or to transfer passages 146, 148, 150 or 152 (see Fig. 7) formed in a non-rotating core piece 154. A ported sleeve 156 is fitted between the ball carrier 142 and the core piece 154, this sleeve being non-rotatable relative to the core piece and the housing 120, and providing a bearing surface upon which the ball carrier 142 may rotate. The ball carrier 142 comprises the driving element of a motor and is provided with driving ears 158 engaging lugs 160 on the driving member 162 of a bi-directional no-back brake unit 100, whose details of construction are shown in Fig. 3.

Referring now to Fig. 7, assume that the core piece passages 152 and 148, which are interconnected by drillings 164, are provided with pressurized hydraulic fluid. Assume likewise that the interconnected passages 146 and 150, at right angles to the other passages comprise a low pressure zone. Pressure fluid passes from the passages 152 and 148 into those cylinders 140 in the upper and lower quadrants of the raceway 136, urging the balls 138, which act as pistons, outwardly to engage the raceway. These quadrants are identified as the zones between the major and minor axes of the elliptical raceway 136. The raceway slope in these quadrants is such that, when the corresponding cylinders 140 are pressurized, the balls move outwardly and enforce clockwise rotation of the ball carrier 142. As a ball and cylinder approach the major axis of the elliptical raceway 136, its passage 144 is cut off from communication with the feed passage 148 or 152 and shortly, such passage 144 is opened to either of the core piece passages 146 or 150. Thereupon, as the balls are pushed inwardly within their respective cylinders when bearing on the lateral quadrants of the raceway, fluid is driven from the cylinders 140 until the passages 144 nearly reach the minor diameter points on the elliptical raceway 136. Thereafter, the sequence for each cylinder begins again for the outward movement of the balls 138 in their cylinders under the influence of high pressure fluid. This mechanism in effect is a radial cylinder piston motor, the balls comprising the pistons, and by virtue of the elliptical raceway provides two strokes for each ball piston for each revolution of the raceway. A motor of high capacity and small bulk is attained by the use of the ball piston technique and thus this type of motor is extremely appropriate for utilization in an aeronautical propeller.

Referring now to Fig. 2, the rightward or inboard end of the non-rotating motor race 132 is formed with a ball bearing raceway 166 engaged by bearing balls 168 which in turn support a pump race 170. Against the inboard face of the race 170, a second pump race 172 bears, the latter having at its far end a ball bearing raceway 174 engaged by bearing balls 176 which in turn engage a stationary ball race 178 fitted within the housing 120. Thus the two ball races 170 and 172 which are portions of a pump unit, are concentrically supported for relative rotative movement within the housing 120. Both of these races are provided with bevel gear portions 180 and 182 facing one another, said gears being engaged by one or more housing-mounted bevel pinions 184. One of these pinions includes a central shaft 186. Rotation of the shaft 186 causes equal and opposite rotation of the pump races 170 and 172 for a purpose which will become apparent shortly. Also, drive reaction when the pump is under load is assumed by the pinions 184 and is transmitted thereby to the housing 120. Since the drive reaction on both races 170 and 172 will be the same in magnitude and direction, and is assumed in a balanced manner by the pinions, control of position of the races 170 and 172 may be made by turning the pinion 184 without any appreciable torsional load on the pinion shaft 186.

Both races 170 and 172 are provided with elliptical raceways 188 of the same general configuration but smaller in diameter than the raceway 136 of the motor unit. A ball carrier 190 carries tandem sets of radial cylinders 192 which, like the cylinders 140 of the motor unit, communicate with passageways leading to the several core passages 146 to 152, through appropriate openings in the sleeve 156. The pump ball carrier 190 is rotatably mounted upon the sleeve 156 and is provided with one or more driving dogs 194 drivably engageable with coacting dogs 196 formed upon the hub of the pump driving gear 94. The latter may be rotatably carried on the stationary sleeve 156 through needle bearings 198. It will be seen that the passages 146 to 152 extend axially to establish free communication between alined sets of pump cylinders 192 and motor cylinders 140.

Means are provided to feed hydraulic liquid or oil to the power unit 88, such means including a chamber 112 formed at the end of the pump housing 120, said chamber being in communication with the fluid pickup 110 previously described in connection with Fig. 1. A spring loaded ball check valve 200 is disposed between the chamber 112 and the core passage 146 and 150, a similar check valve not shown being provided between the chamber 112 and the cored passages 148 and 152. Through one or the other of these valves, whichever is at low pressure, fluid may pass to the pump-motor system to make up for such leakage as may occur in the operation thereof.

Figures 4A, 4B, 4C, 5A, 5B, 5C:
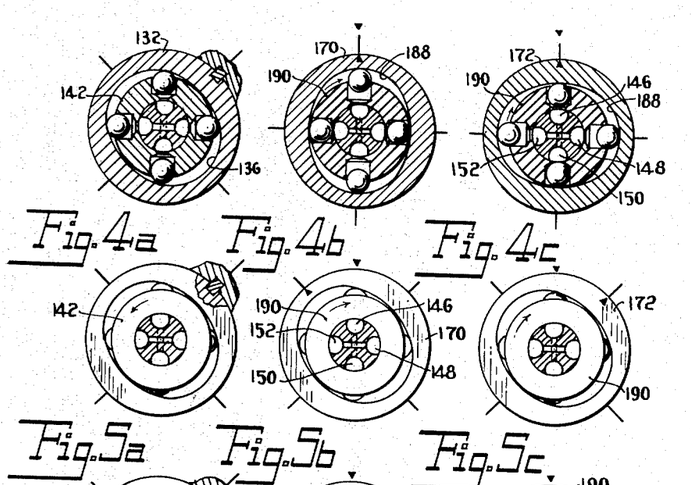
Figs. 4a, 4b and 4c are sections, on a reduced scale, through the power unit of Fig. 2 on lines a, b and c respectively, in the adjusted position for zero rate of pitch change.
Figs. 5a, 5b and 5c are end elevations of portions of the power unit substantially on the lines a, b and c respectively of Fig. 2 showing the elements adjusted for maximum rate of pitch change in one direction.

Reference may now be made to Figs. 4a, 4b and 4c which show schematically, the position relationships of the pump and motor elements for zero pump output and consequently for zero motor output. Herein, the races 170 and 172 for the pump are adjusted by means of the pinion 184 of Fig. 2, so that the major axis of the elliptical raceway 188 of the race 170 is vertical and the major axis of the raceway 188 of the race 172 is horizontal as shown. The elliptical raceway 136 of the motor race 132 remains with its major axis fixed at an angle of 45°, the same as in Fig. 7. Now, assuming that the pump ball carrier 190 is rotated clockwise by the drive gear 94, the balls in Figs. 4b and 4c will pump during about half of their travel through each quadrant of the elliptical raceway and will suck during the other half of the quadrant travel. Since the pumping and suction functions in Figs. 4b and 4c are out of phase with one another, there will be no effective pump output to pressurize either pair of core passages 146, 150 or 148, 152. Thus, no effective fluid pressure will be delivered to the motor unit of Fig. 4a and the ball carrier 142 of the motor will not be driven.

Now reference may be made to Figs. 5a, 5b and 5c. Here, the pump race 170 in Fig. 5b has been turned 45° to the left of the vertical while the pump race 172 of Fig. 5c has been turned 45° to the right, by the action of the bevel pinion 184 of Fig. 2. The elliptical raceways of the two races have the same position relationship to the cored passages 146—152, their major axis being sloped 45° from the left of vertical. Still assuming clockwise rotation of the ball carrier 190, the upper and lower quadrants of the ellipses will be pumping zones and the lateral quadrants will be suction zones in both units of the pump. Accordingly, the passages 146 and 150 will be pressurized, the fluid passing along these passages and causing rotation of the ball carrier 142 of the motor in a counter-clockwise direction. The positions of the pump races 170 and 172 in Figs. 5b and 5c represent maximum pump output in one direction and it is clear that any relative positions of the pump races 170 and 172 between the positions represented by Figs. 4b and 4c on the one hand and 5b and 5c on the other hand will cause an intermediate amount of liquid delivery between zero and maximum to cause hydraulic motor operation at an intermediate speed between zero and maximum in the counter-clockwise direction. Thus, relative adjustment of the races 170 and 172 through the pinion 184 may be made rapidly and expeditiously to control the rate of delivery of the pump units and thus to control the speed rate of the motor rotor 142.

In Figs. 6b and 6c, the races 170 and 172 have been rotated through operation of the pinion 184 so that the major axes of the elliptical races lie 45° to the right of the vertical. Thus, with clockwise rotation of the ball carrier 190, the cored passages 148 and 152 will receive pump delivery and will be pressurized, while the core passages 146 and 150 are feed passages for the pump cylinders, receiving the fluid discharged from the motor unit in Fig. 6a. With pressurized passages 148 and 152 the motor ball carrier 142 is forced to rotate in a clockwise direction—the reverse direction from that shown in Fig. 5a. When the major axes of the elliptical races of the raceways 170 and 172 are parallel and sloped as shown in Figs. 6b and 6c, the dual pump yields maximum delivery to operate the motor in the direction indicated in Fig. 6a. Likewise, any position of the major axes of the raceway ellipses between those of Figs. 6b and 6c on the one hand and Figs. 4b and 4c on the other hand, will produce rotation of the motor rotor 142 at reduced speed.

The close coupling of the pump and motor units of the power unit 88, above described, enables unified compact construction thereof wherein fluid pressures may be very high, and wherein pressurized fluid is confined wholly within the unit. Extensive sealing and plumbing provisions become unnecessary. All of the fluid lines in the entire system other than those integrally contained within the hydraulic power unit are low pressure lines whereby leakage is minimized.

Description of no-back brake

Reference may be again made to Fig. 3 wherein the bi-directional no-back brake 100 is clearly depicted. The unit includes a brakedrum 204 secured against rotation, the drum having a smooth cylindrical bore engaged lightly by a multi-coil helical spring 206. The dogs 160 on the driving sleeve 162 are driven by ears 158 of the hydraulic motor ball carrier 142 (Fig. 2). The sleeve 162 is loosely entered through the spring 206, and within the sleeve 162 a driven shaft 208 is loosely fitted, said shaft 208 serving to drive the pump output gear 86. A driven pin 210 carried by the shaft 208 loosely engages a driving slot 212 formed in the sleeve 162. When the motor rotates to drive the gear 86 the drive is afforded through the pin-slot connection 210, 212. If the motor is stationary and if there should be a reverse driving urge from the gear 86, a pin 214 on the shaft 208, presuming the reverse driving urge to be clockwise, engages one end of the spring 206, tending to unwind the spring into engagement with the drum 204. The wrapping effect of the spring amplifies with the number of convolutions of spring in engagement with the drum and provides an effective brake to prevent anything but very minor movement of the gear 86. If the direction of reverse rotational urge of the gear 86 be counter-clockwise, another pin 216 on the shaft 208 engages the other end of the spring 206 urging said end into drum engagement and locking the shaft system from counter-clockwise rotation. It will be noted that the ends of the spring 206 are provided with inwardly bent hook-like portions, one being shown at 218. These hook-like portions enter into a slot 220 formed in the driving sleeve 162. The circumferential clearance relationships between the several pins, slots, spring and their spring hooks are so selected that when the driving sleeve rotates, for instance counter-clockwise, the edge of the slot 220 in said sleeve picks up the hook 218 tending to unwind the spring 206 from engagement with the drum thereby permitting free driving rotation of the system in the direction 162 to 86. Likewise, the hook 218 at the other end of the spring may be engaged by the other side of the slot 220 if counter-clockwise rotation is imparted to the sleeve 162 thereby unwinding the spring from drum engagement starting at its other end to permit free clockwise rotation when the drive direction is from 162 to 86. This particular mechanism, briefly described herein, does not constitute a portion of this invention since it is a known commercially available article. It is described functionally however so that its utility in connection with the operation of the propeller and control system of the invention may be properly appreciated.

It is further noted that the ball piston arrangements of the pump and motor components of the power unit 88 are not per se, a part of this invention. It is considered that the piston pump control system herein disclosed is novel and inventive. It is further considered that propeller pitch changing and control systems using a hydraulic pump-motor unit of the type herein disclosed, or other close coupled hydraulic pump-motor units, whether or not ball pistons are used are novel and inventive.

Figure 8:
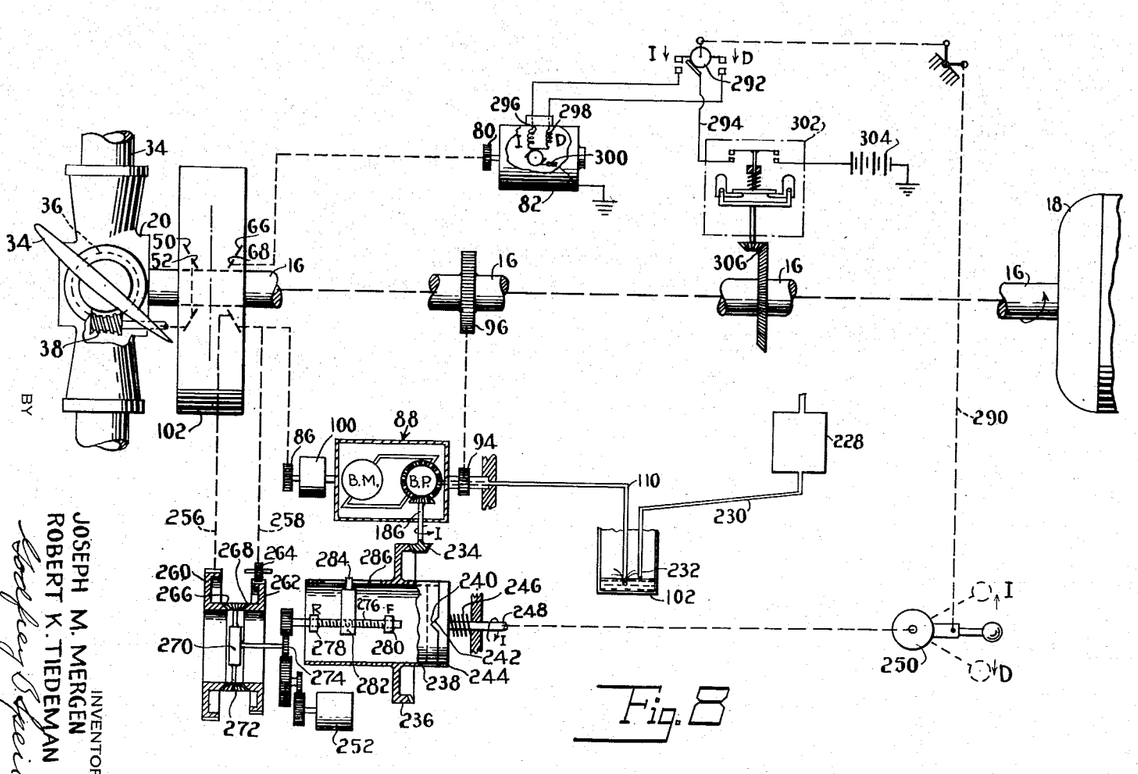
Fig. 8 is a schematic view of the propeller of the invention showing a control system therefor adapted for "rate" type control and pertaining in particular to the propeller system shown in Fig. 1.

Control system of Figure 8

Fig. 8 shows schematically one type of control system adapted for utilization with the type of propeller previously described which incorporates a pitch changing mechanism, a transfer gearing, a hydraulic power unit, and an alternative electric power unit. The major assemblies shown in Fig. 8 will be recognized in connection with the prior figures, and additional components and sub-assemblies are shown schematically to render the control system complete. The hydraulic power unit 88 with its associated bi-directional no-back brake 100 is connected to the intergearing within the housing 102 in a fashion previously described.

Fluid for the hydraulic power unit is drawn from the rotating sump 102 through the scoop 110 and if desired, a static sump 228 may be provided on a stationary portion of the propeller with a conduit 230 leading into the sump 102, with the scoop 232 radially inboard of the pump feed scoop 110. By this means, the amount of fluid in the rotating sump 102 may be maintained substantially constant during operation, the scoop 232 skimming excess fluid from that in the sump 102 and returning it to the sump 228. Should fluid level in the sump 102 decrease, fluid will flow thereto automatically from the sump 228 until the proper level is established.

Control of the power unit 88 is afforded by the power unit control shaft 186 which may be turned to produce zero pitch change, or increase or decrease pitch change at any rate desired up to the maximum capacity of the power unit. For this purpose the shaft 186 carries, as one workable arrangement, a pinion 234 meshed with a gear 236 carried on a sleeve 238. The latter is provided with a notched end 240 engaged by a projection 242 on a disc 244 which is spring loaded as at 246 into driving engagement with the sleeve 238. A shaft 248 or other suitable remote drive extends to a rate of pitch change controller 250 which may be turned for any desired rate of pitch change. This adjuster although shown as a manual control lever may be the output element of an automatic rate of pitch change controller appropriate for use with gas turbines or other kinds of prime movers. As the controller 250 is turned in either direction, its motion is transmitted to the shaft 186 to provide pitch change control at a rate in accordance with the amount of turning of the controller. Return of the controller to the mid-position terminates pitch change.

In a rate of pitch change control system for a propeller it is usually essential to have a pitch indicator, here designated 252, which ties in with an automatic control system if desired. Pitch indication is secured by the relative position of the inner and outer inboard bevel gears 66 and 68 of the transfer gearing. Gear takeoffs are led from the gears 66 and 68 as at 256 and 258 to gears 260 and 262 of a differential mechanism, an idler gear 264 being interposed in drive 258 to establish the proper direction of travel of gear 262. The gears 260 and 262 are provided with facing bevel gears 266 and 268 between which is interposed a spider 270 carrying bevel pinions 272 meshed with the bevel gears 266 and 268. The spider, through a gear 274, drives the pitch indicator 252 through an appropriate reduction gear if desired and likewise drives a screw shaft 276 having feather and reverse pitch limit stops 278 and 280 secured thereto. A traveling nut 282 engages the threaded shaft 276 and carries a projection 284 slidably engaged in a longitudinal slot 286 formed in the sleeve 238.

When a rate of pitch change is called for, the sleeve 238 is turned to produce pitch change at any desired rate in the power unit 88 in the appropriate direction. As blade pitch changes, the differential embodying the elements 260 to 272 produces a concurrent indication on the pitch indicator and likewise rotates the screw shaft 276 traversing the nut 282 toward the stop 280 or the stop 278 depending on the pitch change called for. At any time, the controller 250 may be moved to stop pitch change or to shift the direction of pitch change as desired.

If the pitch increase demand is to feather the propeller, the nut 282 will reach the stop 280, and the nut will be constrained to rotate with the shaft 276, thereby turning the sleeve 238 in a direction to terminate pitch increase. Concurrently, the torque on the sleeve 238 overcomes the connection 240, 242, springing the disc 244 outwardly from the sleeve and turning the sleeve to the position of zero pitch change. This occurs even though the pitch increase controller 250 may still call for an increased rate of pitch change. Upon readjustment of the controller 250 to no pitch change or to decrease pitch, the elements 240 and 242 will reengage in readiness for the next pitch change demand.

If the pitch change call were for continued decreased pitch to the low or reverse pitch limit a similar general operation would occur, the nut traveling leftwardly to engage the stop 278 whereupon the sleeve 238 is rotated to cause stoppage of the decreasing pitch change.

The actual mechanism, shown schematically, contains suitable bearings, housings and proportioning of parts to attain a clean design. It will further be noted that if pitch change were terminated by action of the screw shaft 276 and traveling nut 282, pitch change in the opposite direction may immediately be initiated by moving the controller 250 so that the projection 242 reengages the notch 240 whereupon the sleeve 238 may be turned to initiate pitch change in the direction opposite to that which was called for when pitch change was stopped by the limit stops 278 or 280.

The controller 250 is also connected by a link 290 to an electrical reversing switch 292 of two-pole single throw form. A power lead 294 leads to the center portion of the switch and the switch may connect this power lead through the conductors shown either to a pitch increasing field winding 296 or pitch decreasing field winding 298 of the series D. S. motor 82. The common return to ground of the motor circuit, includes a solenoid 300 which actuates an electro-magnetic brake. This type of motor is well known in the art particularly in conjunction with electrically operated controllable pitch propellers. When the motor is energized, for either increasing or decreasing of pitch, the solenoid 300 releases the brake normally holding the motor against rotation. When the motor is de-energized, the brake is applied by an appropriate spring, locking the motor armature from rotation and thereby locking the motor output gear 80 to comprise an anchor gear for the transfer gearing contained within the housing 102 in a manner previously described.

The power lead 294 connected to the switch 292 leads through a centrifugal switch 302 to a power supply 304 and thence to ground. The centrifugal switch 302 which may be of any appropriate type, is driven as by gears 306 from the propeller shaft or propeller hub and the switch is so arranged as to break the power circuit to the motor 82 when R. P. M. of the propeller is more than a specified amount, the order of magnitude being around 150 R. P. M. If the propeller R. P. M. falls below the selected value the centrifugal switch 302 closes, then permitting pitch increase or pitch decrease to be accomplished by the motor 82 in accordance with control movements of the controller 250.

In the general operation of the system, the hydraulic power unit 88 is available to change propeller pitch when the propeller is rotated since the hydraulic power unit derives its energy from the rotating propeller shaft. The hydraulic power unit is effective for changing propeller pitch through all normal operations of the propeller including the initial stages of feathering, the final stages of unfeathering, transition to reverse pitch, and transition from reverse pitch to normal pitch. In all of these regimes, the electric motor 82 is de-energized, the gear 80 of the motor providing the reaction element of the transfer gearing. Under static conditions when the propeller shaft 16 is not rotating, pitch changes may be effected in the propeller by manipulation of the control 250 which energizes the electric motor 82 to change pitch in either direction as desired. This static mode of operation may be needed to readjust the propeller to flat pitch, for instance, when starting a prime mover gas turbine. The electric motor 82 also functions to change pitch in the final stage of a feathering operation and in the initial stage of an unfeathering operation where propeller pitch has been so increased that propeller rotational speed is below that value at which the pump of the hydraulic unit 88 delivers sufficient fluid to cause pitch change at an adequate rate. When the electric motor 82 operates, the bi-directional no-back brake 100 in the hydraulic power unit 88 enables the power unit output gear 86 to act as an anchor gear for the transfer gearing contained within the housing 102.

Figures 9, 9A:
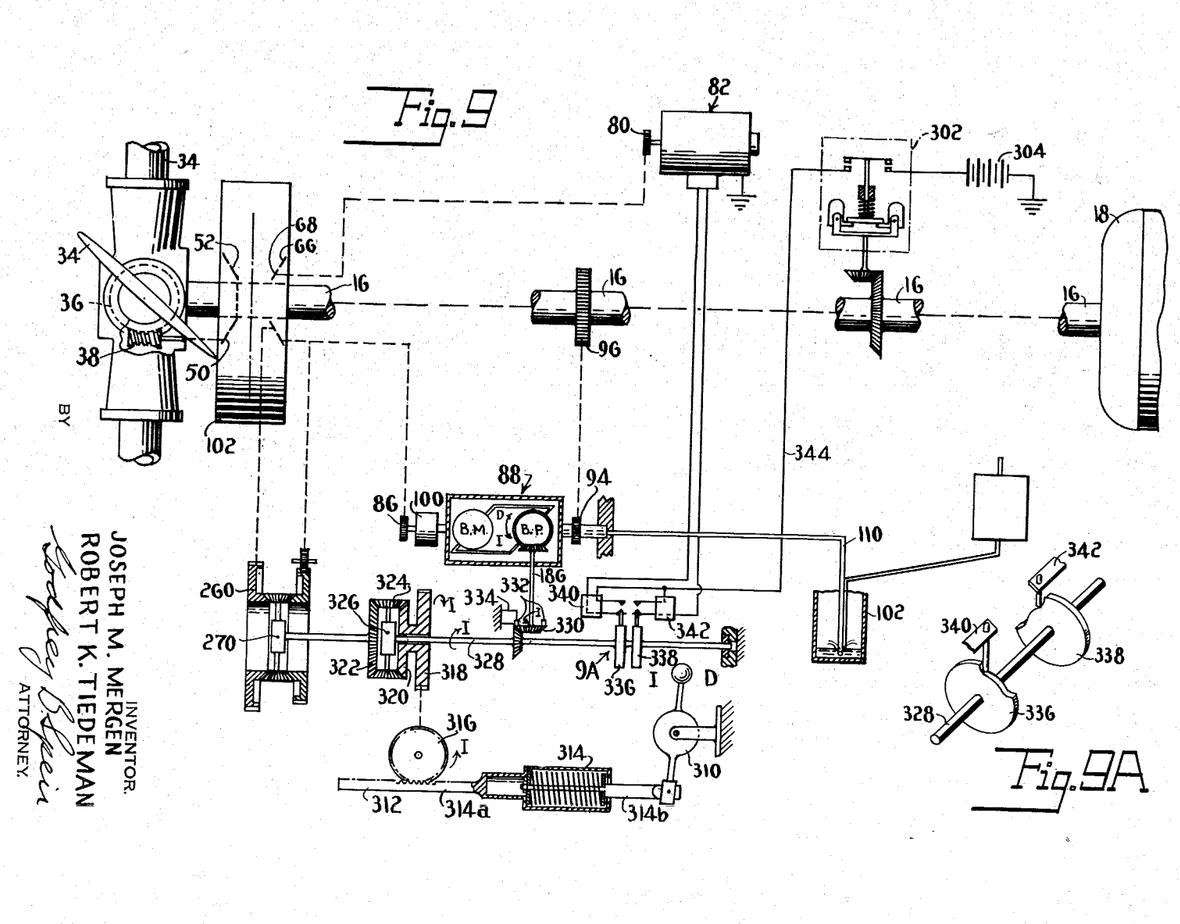
Fig. 9 is a schematic representation of a propeller and control system therefor adapted for "blade angle" type of control and adapted particularly for the type of propeller structure shown in Fig. 1.
Fig. 9a is a perspective view of a portion of Fig. 9.

Control system of Figure 9

The system of Fig. 9 is similar in most respects to that shown in Fig. 8 except for the lowermost portion of the figure and for the connections to the electric power unit 82. A description will not be repeated for those elements which are common to both figures, and similar reference characters identify the similar portions of both figures. The Fig. 9 arrangement comprises a blade angle or beta type propeller control wherein a controller 310 may be moved to a plurality of certain positions each defining a specific blade angle, said blade angles having the range of reverse pitch to feather. The controller 310 may be a manual control handle as shown or it may comprise the output element of an automatic pitch control system for a propeller such as may be used in conjunction with a gas turbine. The controller 310 transmits push-pull motion to a rack 312 through a resilient link 314, the rack 312 transmitting its motion through a train 316, 318, to a bevel gear 320. The link 314 includes a prestressed spring coupling the link portions 314a and 314b, so that the latter may move axially relative to one another, but are urged to a finite relative position by the spring. Another bevel gear 322, facing the gear 320, is connected to the spider 270 of the differential which senses actual pitch existing in the propeller in the same fashion as described in connection with Fig. 8. The bevel gears 320 and 322 engage planet pinions 324 on a spider 326, a shaft 328 for the spider extending through the gear 318 and establishing the position of the control shaft 186 of the hydraulic power unit 88 through a pair of gears 330. The power unit control shaft 186 is provided with stops, or such stops may be incorporated within the power unit, to limit the travel of the ball pump races to those positions at which maximum pump output is yielded for either maximum rate of pitch increase or pitch decrease. For convenience, limit stops 332 are shown on one of the gears of the pair 330, said stops 332 being engageable at times with a fixed abutment 334. The system just described including the controller 310 is so organized that a call for not more than a 2° pitch change from that existing will move the hydraulic unit control shaft 186 so that one of the stops 332 will just engage the abutment 334, causing the hydraulic unit 88 to initiate pitch change at nearly maximum rate. As pitch change occurs, the differential involving the elements 320 to 324 will back off the power unit control shaft 186, reducing the rate of pitch change in a gradual manner until the preselected pitch is attained whereupon the control shaft 186 is neutralized for no pitch change call.

If the controller 310 be operated to call for a pitch change of over 2°, a stop 332 engages the abutment 334 and the resilient link 314 is either stretched or compressed, urging pitch change in the desired direction although one of the stops 332 will be in engagement with the abutment 334. As pitch correction continues, and after the propeller has changed pitch to within approximately 2° of the desired amount, the power unit control shaft 186 will be backed off from the maximum rate setting toward a zero rate setting by the action of the gear train 318 to 328, along with the rack 312, and will stop at the zero rate setting after the energy stored in the resilient link 314 has been expended. Thereupon, the propeller will have attained that pitch setting which has been set by the controller 310. The resilient link 314 has been shown here for simplicity in describing that part of the control system with which this invention is concerned. In practice, the link may be a portion of the turbine control apparatus, and may be electrical, mechanical or hydraulic in character.

The shaft 328 which controls the power unit 88 is also provided with a pair of cams 336 and 338 which serve to establish high and low limits of the propeller pitch range if said limits are reached by utilization of the electrical power unit 82. These cams cooperate with and actuate switches 340 and 342, each switch having one terminal leading to one field winding of the motor 82, the other terminals of the switches being connected through a common lead 344 to the centrifugally responsive switch 302 whose function is identical with that described in connection with Fig. 8. Assuming that the cam 336 serves to establish the feather limit of the propeller, it will be so formed as to turn its switch 340 off when no pitch change is being called for by the shaft 328, but it will close the switch 340 for pitch increase whenever the shaft 328 calls for pitch increase. In the same fashion, the cam 338 may serve to establish the decrease or reverse pitch limit and will normally open the switch 342 when there is no pitch change call, but will close the switch 342 whenever there is a pitch decrease call by the shaft 328.

To explain the operation of the feathering limit cam 336, let it be assumed that the controller 310 is moved to call for the feather position. Thereupon, the shaft 328 calls for increase pitch change and will continue such call through the occurrence of propeller speed diminution and closure of the centrifugal switch 302. When the switch 302 closes and since the cam 336 has closed the switch 340, the power unit 82 will continue pitch increase of the propeller. The differential 318 to 326 senses the actual pitch of the propeller and when feathering has been attained the spider 326 will turn the shaft 328 to call for no more pitch change. Then, the cam 336 will open the switch 340, stopping the power unit 82 and leaving the propeller in the feather position.

At the feather position and at all other pitch positions except the low limit, the switch 342 will be closed by the cam 338. When a pitch decrease call is made by the controller 310, the power unit 82 will initiate and carry on pitch decrease so long as the centrifugal switch 302 is closed. When R. P. M. rises to the proper value, the switch 302 will open, restoring further pitch change to the hydraulic power unit 88.

Static pitch changes may be made in a manner similar to that above described, by the electric power unit 82, when lack of rotational speed renders the hydraulic power unit 88 impotent.

Figure 10:
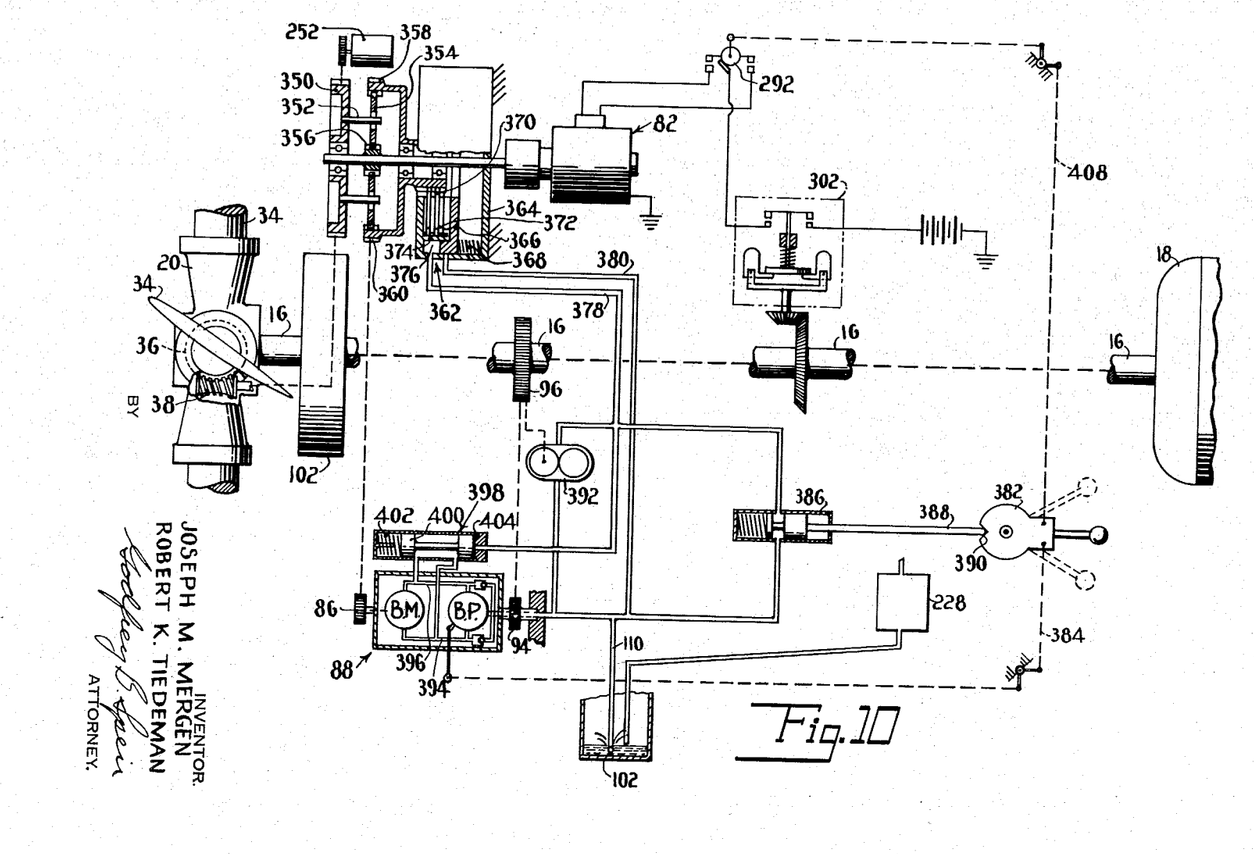
Fig. 10 is a schematic representation of a propeller and a control system therefor and constituting an alternative system to that of Figs. 8 and 9, adapted essentially for "rate" control.

Control system of Fig. 10

In the propeller control system shown in Fig. 10, many of the components comprising the system are similar to those previously described, and such similar components are identified by the same reference characters as used heretofore. In this system however several different techniques are utilized for the control of the hydraulic power unit 88 and for the application of pitch changing power from both the hydraulic and electrical power units to the propeller pitch changing system. The transfer gearing contained within the housing 102, while like that of the transfer gearing previously described, contains a single pitch changing inboard gear, the other inboard gear being anchored against rotation. The gears alluded to are for instance the gears 66 and 68 previously described. The pitch changing input gear is drivably connected to a gear 350 carrying shafts 352 for spider pinions 354. Said pinions are meshed at their inner runs with a sun gear 356 and at their outer runs with a ring gear 358, the latter having an external gear 360 drivably connected to the output gear 86 of the hydraulic power unit 88. The sun gear 356 is drivably connected, directly if desired, to the electric motor power unit 82.

The position of the gear 350 relative to the stationary structure of the power plant is an index of the pitch position of the propeller blades since it is directly geared to them. A pitch indicator 252 may be directly drivably connected with the gear 350.

The hydraulic power unit 88 is not, in this embodiment, provided with the bi-directional no-back brake previously described but rather, the ring gear 358 may at times be locked against rotation by means of a hydraulic brake 362. This brake comprises a housing 364 formed interiorly as a cylinder, and contains an annular piston 366 loaded by springs 368 to press against a series of brake discs 370 and 372 the former being splined on the hub of the gear 358 and the latter being splined in a portion 374 of the housing 364. The housing in conjunction with the housing portion 374 defines an annular cylindrical chamber 376 closed by a portion of the piston 366, and pressurized fluid may be fed at times to the chamber 376 through a conduit 378 to move the piston 366 rightwardly as shown whereby the springs 368 are compressed and the brake discs 370 and 372 are relieved from pressure and are permitted to rotate relative to one another. A relief conduit 380 enters the housing 364 in spaced relation to the conduit 378 so that as pressure fluid passes into the chamber 376, and as the piston 366 uncovers the conduit 380, fluid may bleed into the line 380 and thence as shown into the centrifugal sump 102.

Referring now to the hydraulic power unit 88 and the particular hydraulic circuits therefor, a rate of pitch change controller 382 is provided with control linkage 384 leading to the pump element of the power unit 88 whereby the output of the pump element may be varied in accordance with the position of the controller 382 in a manner previously described. When the controller 382 is in a central position as shown, pump delivery will be nil and no pitch change will be called for. In the neutral position of the controller 382 a shutoff valve unit 386 is adjusted to an open position by the entry of a valve operating rod 388 of the valve unit 386 into a notch 390 of the controller. This valve when open permits dumping of the fluid in the brake conduit 378 to the sump 102 and in addition, unloads a propeller shaft driven gear pump 392 to the sump 102 thereby permitting locking of the brake 362 and anchoring of the gear 350 and of the transfer gearing to prevent pitch change. In addition, the two connecting conduits 394 and 396 between the pump and motor elements of the power unit 88 are provided with a short-circuiting valve assembly 398. One end of a valve element 400 of the assembly is spring loaded at 402 toward an open position to establish a short-circuit between the lines 394 and 396. The other end of the valve assembly 398 is provided with a chamber 404 connected to the output of the pump 392. When pressure from the pump 392 is applied to the chamber 404, by the closing of the drain valve 386, the short-circuiting valve element 400 is moved leftwardly to shut off communication between the lines 394 and 396 whereby pumped liquid flows directly to the ball motor, and returns from the motor directly to the pump, to initiate propeller pitch change.

Summarizing the functions attained by the above described structure, when the controller 390 is centralized for no pitch change, the valve 386 is open, the brake 362 is applied by the spring 368, the pump 392 is unloaded and the lines 394 and 396 are short-circuited by the valve 398. Also, the pump of the unit 88 is adjusted for no output. When a pitch change is called for in either direction by the controller 382 by raising it or lowering it from the neutral position, shown in solid lines, the valve 386 is closed and, through the linkage 384, the pump of the unit 88 is adjusted for any output depending upon the degree of movement of the controller 382. Through closure of the valve 386, the pump 392 is loaded whereupon pump pressure enters the brake chamber 362 to relieve the brake, and pump pressure is also applied to the chamber 404 of the short-circuit valve 398 to stop the short-circuit and to enforce operation of the pitch change motor of the unit 88 in response to fluid from the pump of the unit 88.

During the above described operation it is assumed that the propeller is rotating and that the power unit 88 and the pump 392 are driven from the propeller shaft as by the gear 96 and that power derived from the propeller shaft is available to effect propeller pitch changes in response to movement of the rate controller 382. This rate controller may either by a manual controller as shown or may be the output element of an automatic mechanism forming a portion of the power plant.

It will further be noted that the hydraulic circuit controls positive lock of the propeller against pitch change when no pitch change is called for through operation of the brake 362. Also by the short-circuiting of the power unit 88 any creep of the power unit is prevented in case the zero setting for output of the pump of the power unit 88 is not precise.

For standby operation of the propeller when the latter is not rotating, or for the final stages of feathering and the initial stages of unfeathering when the rotational speed of the propeller is insufficient to cause the power unit 88 to yield an adequate rate of pitch change, the electric power unit 82 may be brought into play. This unit 82 is like that previously described, the motor being reversible and having a magnetic brake therein which locks the motor shaft against rotation when the motor is not energized. The centrifugal switch 302, like that previously described, is in circuit with the motor 82, the circuit likewise containing a reversing switch 292 which is actuated through a linkage 408 by the controller 382. Assuming that the rotational speed of the propeller is sufficiently low to close the centrifugal switch 302, a call for pitch change by the controller 382 will operate the switch 392 either to increase or decrease the pitch of the propeller. The motor 82 thereupon will rotate the sun gear 356, the ring gear 358 being anchored by the operation of the brake unit 362, whereby pitch transmitting motion is transmitted to the gear 350 and thence to the transfer gearing and the propeller. This system as inferred previously in the specification is alternative to the other systems shown herein.

Figure 11:
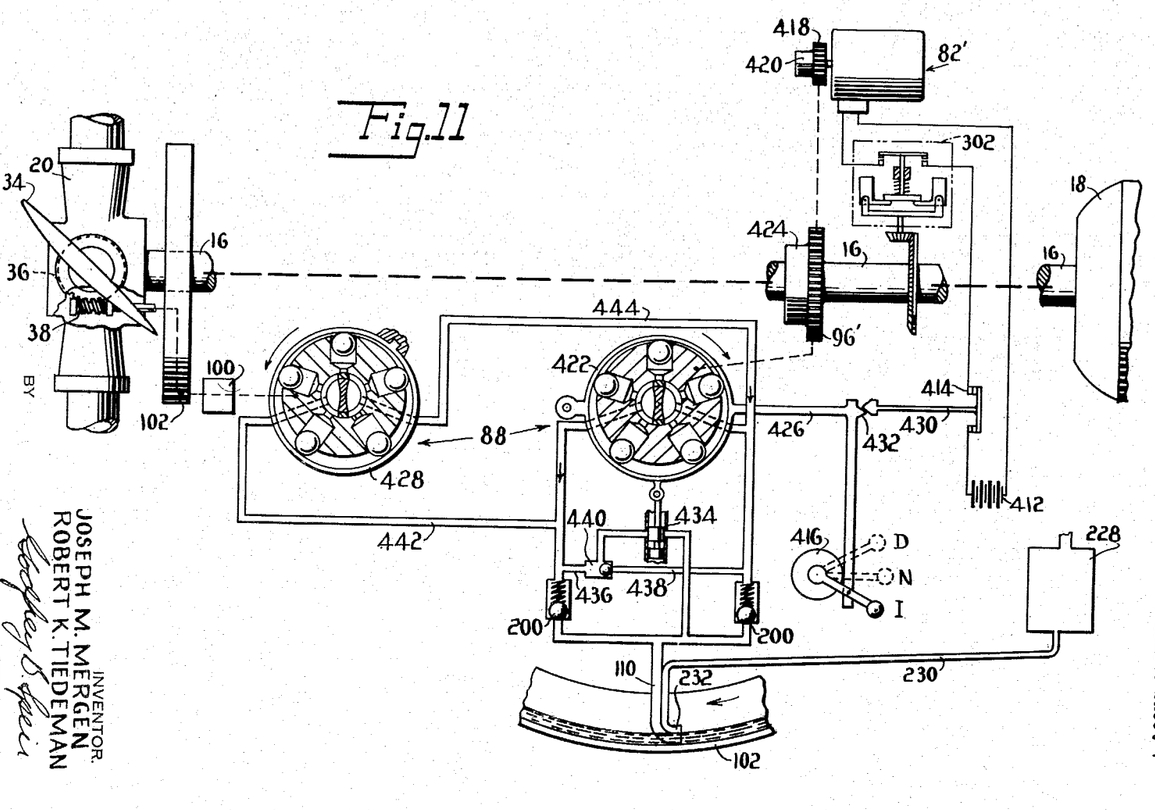
Fig. 11 is a schematic representation of a propeller and another "rate" type of propeller control associated therewith.

Control system of Figure 11

In the propeller control system shown in Fig. 11, which includes a considerable number of components analogous to those already described, the power unit 88 is utilized to effect propeller pitch changes through the transfer gearing contained in the housing 102, whether the propeller be rotating at high or low speed or whether it be static. In this arrangement, a uni-directional electric motor 82' is connected to a power source 412 through the previously described centrifugal switch 302 and through a switch 414 actuated by a controller 416. The shaft of the motor 82' is connected to its output gear 418 through a one-way clutch 420, the gear 418 having a driving connection with a gear 96' which also serves to drive the pump 422 of the hydraulic power unit 88. The gear 96' is connected to the shaft 16 through a one-way clutch 424.

When the propeller is rotating, the pump 422 is driven by the gear 96' through the overrunning clutch 424 from the propeller shaft 16. At this time, the overrunning clutch 420 of the motor 82' overruns the shaft of the motor 82'. Calls for pitch change at any desired rate within the capacity of the pump 422 may be made by the controller 416 which is connected by a suitable linkage 426 to the movable race of the pump 422. As shown, the controller 416 is calling for increased pitch, the pump having a positive displacement in the appropriate direction to drive the hydraulic motor 428 of the power unit 88 and thus to drive the pitch changing mechanism through a bi-directional no-back clutch 100. When a call for pitch change is made, the switch 414 will close by the operation of the linkage 426 upon a switch arm 430 of the switch 414. In this connection, the linkage 426 carries a projection 432 which holds the switch 414 open when there is no call for pitch change by the controller 416. If any pitch change call is made, the switch 414 closes, readying the circuit of the electric motor 82' for operation.

If propeller speed is low, below a level at which the centrifugal switch 302 closes, the motor 82' will operate, driving the pinion 418 through the clutch 420 and thus driving the gear 96' and the pump 422, the gear 96' at this time overrunning the shaft 16 through the overrunning clutch 424. Accordingly, pitch change is afforded from the power unit 88 driven by the electric motor 82'.

Means are provided to relieve pressure from the power unit 88 at times when no call is made for pitch change by the controller 416. To this end, a bleed valve 434 is actuated by the race of the pump 422 or directly by the controller 416 to relieve pressure on either side of the hydraulic circuit of the unit 88 to the sump. This bleed is accomplished through conduits 436 and 438 leading from both limbs of the power unit circuit to a two-way check valve 440. In the position shown in Fig. 11, the limb 442 of the power unit circuit is pressurized by the pump 422 on account of the call for increased pitch. Thus, the ball of the valve 440 closes off the conduit 438 due to the pressure in the limb 442 and this pressure is transmitted to the closed valve 434. As soon as the call for pitch change ceases by the movement of the controller 416 to the neutral position, the valve 434 is opened, relieving the hydraulic circuit of the pump 88 of high pressure, through the valve 440 and the valve 434. If a call for decreased pitch then be made, the limb 444 of the hydraulic power unit will become pressurized through the action of the pump 422, the valve 434 will close and the ball of the valve 440 will close against the conduit 446 to hold pressure in the limb 444.

The pump and motor units 422 and 428 shown in Fig. 11 are of the same geenral type as those previously described in connection with Figs. 1 through 7 except that the races thereof are circular and operate in eccentric relation to the ball carriers when pump and motor operation is required. They are specifically different from the previously described arrangements wherein the pump and motor races were elliptical in form and wherein changes in output of the unit 88 were secured by turning the dual pump races relative to one another. In the Fig. 11 pump and motor units, control is secured by changing the eccentricity of the race of the pump rather than turning it around the pump shaft.

In the propeller arrangements above described, it will be noted that the several types of brakes disclosed, including electrical, hydraulic and mechanical, are all located at high speed, relatively low torque portions of the pitch changing driving system. These brakes are for the purpose of holding fixed pitch, as well as for providing a drive reaction element. Any of these brakes may tolerate a considerable amount of backlash without having a significant effect upon blade pitch setting, due to the drive speed reductions between the power units and the blades, including the drive to the transfer gearing from the power units, and the drive from the transfer gearing to the blade shanks.

It is a characteristic of the hydraulic pump-motor unit disclosed herein, particularly as used in the propeller disclosed that there is no power drain from the pump prime moving instrumentality except when power delivery from the motor is called for, and it is further characteristic of the unit that the power drain from the prime mover is in proportion to the power required for any instant pitch changing need, the power unit being unloaded when there is no pitch change demand. It is within the purview of the invention, however, to use the power unit for holding pitch, without, necessarily, utilizing a separate braking unit to anchor the system against rotation when there is no demand for pitch change. It may also be observed that the infinitely variable ratio power unit has capacity for high pitch change rates under full load and speed operation of the propeller, whereas the standby electric motor power unit is preferably of such small size, weight and power as to be capable of changing propeller pitch under static or low propeller rotational speed conditions only.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. A controllable pitch propeller comprising, in combination, a hub having blades mounted therein for pitch change, a power gear, means to hold the gear normally stationary, the gear being concentric with the hub, intergearing connecting said power gear with said blades, said power gear being rotatable in either direction respectively to increase and decrease the pitch of said blades, a unitary power unit, fixedly mounted, comprising a fixed displacement hydraulic motor hydraulically connected with and driven by a variable reversible flow hydraulic pump, the output element of said motor being drivably connected with said power gear, means connecting said pump and propeller to drive said pump at a speed proportional to the speed of rotation of said propeller, means connected to the pump to adjust the flow rate and direction of hydraulic fluid output from said pump to said motor, said means to hold the power gear including an irreversible bi-directional driving mechanism allowing drive from said motor to said power gear but locking said output gear against driving from said power gear, said intergearing comprising a gear concentric with and connected to said power gear having means normally locking it against rotation, and means connected to and operable to drive said concentric gear in either direction when said power unit is not in operation.

2. A controllable pitch propeller comprising, in combination, a hub having blades mounted therein for pitch change, a power gear, means to hold the gear normally stationary, said gear being concentric with the hub, intergearing connecting said power gear with said blades, said power gear being rotatable in either direction respectively to increase and decrease the pitch of said blades, a unitary power unit, fixedly mounted, comprising a fixed displacement hydraulic motor hydraulically connected with and driven by a variable reversible flow hydraulic pump, the output element of said motor being drivably connected with said power gear, means connecting said pump and propeller to drive said pump by and at a speed proportional to the speed of rotation of said propeller, means connected to said pump to adjust the flow rate and direction of hydraulic fluid output from said pump to said motor, said means to hold the power gear including an irreversible bi-directional driving mechanism allowing drive from said motor to said power gear but locking said output gear against driving from said power gear, said intergearing comprising a gear concentric with said power gear and having means normally locking it against rotation, and means connected to and operable to drive said concentric gear in either direction when said power unit is not in operation, said latter means being responsive in its operation, in part, to less-than-normal rotational speed of said propeller.

3. In gearing for a controllable pitch propeller comprising a hub having blades mounted therein for pitch change, a pair of bevel gears adapted to be concentric with the hub, one being fixed thereto and rotatable therewith and the other being rotatable relative to said hub, gearing adapted to drivably connect said other gear with said blades, a spider assembly concentric with said bevel gears having independently rotatable sets of bevel pinions, one set engaged with said one bevel gear and the other set being engaged with said other bevel gear, a second set of bevel gears facing said first gears, one engaging said one set of pinions and the other engaging said other set of pinions, a first means connected to drive said one gear of the second set, a second means connected to drive said other gear of the second set, said means respectively having driving elements rotatable in either direction, means connected to said one gear to lock same from rotation while the other is being driven, and means connected to said other gear to lock same from rotation while the one gear is being driven.

4. A controllable pitch propeller comprising in combination, a hub having blades mounted therein for pitch change, a pair of bevel gears concentric with the hub, one being fixed thereto and rotatable therewith and the other being rotatable relative to said hub, gearing drivably connecting said other gear with said blades, a spider assembly concentric with said hub having independently rotatable sets of bevel pinions, one set engaged with said one bevel gear and the other set being engaged with said other bevel gear, a second set of bevel gears facing said first gears, one engaging said one set of pinions and the other engaging said other set of pinions, a first electric motor means connected to and operable to drive said one gear of the second set, a second means connected to lock said one gear, a third hydraulic motor means connected to and operable to drive said other gear of the second set, a fourth means connected to lock said other gear, said first and third means respectively having driving elements rotatable in either direction, and said propeller including a non-rotatable portion to which said driving elements are secured, and mechanism incorporated in said first and third means respectively connected to and to operate said second and fourth means for locking respective gears when said first and third gears are respectively not driving.

5. A controllable pitch propeller comprising in combination, a hub having blades mounted therein for pitch change, a pair of bevel gears concentric with the hub, one being fixed thereto and rotatable therewith and the other being rotatable relative to said hub, gearing drivably connecting said other gear with said blades, a spider assembly concentric with said hub having independently rotatable sets of bevel pinions, one set engaged with said one bevel gear and the other set being engaged with said other bevel gear, a second set of bevel gears facing said first gears, one engaging said one set of pinions and the other engaging said other sets of pinions, a first means independent of propeller rotation connected to and operable to drive said one gear of the second set, a second means connected to lock said one gear, a third means connected to be driven by the propeller and connected to drive said other gear of the second set, a fourth means connected to lock said other gear, said first and third means respectively having driving elements rotatable in either direction, mechanism incorporated in said first and third means respectively connected to operate said second and fourth means for gear locking when said first and third means respectively are not driving, and mechanism responsive to slowdown of said propeller shaft to a certain level to initiate operation of said first means.

6. In an aeronautical propeller having a hub and blades movable for pitch change therein, gearing comprising a pair of concentric bevel gears adapted to lie on and coaxial with the hub, rotatable therewith and one of them rotatable to the hub, driving connections from said one bevel gear to said blades, a second pair of concentric bevel gears, rotatable at times and facing said first pair, means to control the rotational movement of each gear of said second pair and connected thereto, a plurality of pairs of bevel pinions between and meshed with said pairs of bevel gears, the bevel pinions of each pair being relatively rotatable, a journal for each pair of bevel pinions, and a pair of annular bands connecting and holding said journals in predetermined relation, said bands, journals and bevel pinion pairs being characterized as an assembly by position location thereof solely by the engagement of the several bevel pinions with the several bevel gears.

7. In an aeronautical propeller having a hub and blades movably mounted therein for pitch change, said propeller having a fixed portion, an infinitely variable drive ratio close-coupled hydraulic pump-motor unit on said fixed portion, means drivably connecting said pump to said propeller, a transfer gearing drivably connecting said motor with said propeller blades, means connected to said unit for varying the drive ratio thereof, alternative power means drivably connected to said transfer gearing, and means connected to said ratio adjuster means responsive to a call for pitch change, means responsive to low rotational speed of said propeller, means connected to both said responsive means and to said alternative power means for initiating operation of said alternative power means.

8. In an aeronautical propeller having a hub and blades removably mounted therein for pitch change, said propeller having a fixed portion, an infinitely variable drive ratio close-coupled hydraulic pump-motor unit on said fixed portion, means drivably connecting said pump to said propeller, a transfer gearing drivably connecting said motor with said propeller blades, adjuster means connected to said unit for varying the drive ratio thereof, alternative power means drivably connected to said transfer gearing when propeller rotational speed is low, means responsive to low propeller speed connected to the propeller, means connected to both said adjuster means and said speed responsive means and to said alternative power means for energizing the latter, means connected to said hydraulic power unit to lock it against rotation when the alternative power means is in operation, and means connected to said alternative power means to lock it against rotation when said hydraulic unit is in operation.

9. In an aeronautical propeller having a hub and blades movably mounted therein for pitch change, said propeller having a fixed portion, an infinitely variable drive ratio close-coupled hydraulic pump-motor unit on said fixed portion, means drivably connecting said pump to said propeller, a transfer gearing drivably connecting said motor with said propeller blades, adjuster means connected to said unit for varying the drive ratio thereof, alternative power means drivably connected to said transfer gearing when propeller rotational speed is low, means responsive to low propeller speed connected to the propeller, means connected to both said adjuster means and speed responsive means and to said alternative power means for energizing the latter, means connected to said hydraulic power unit to lock it against rotation when the alternative power means is in operation, and means connected to said alternative power means to lock it against rotation when said hydraulic unit is in operation, both said locking means being operative to lock the respective power unit and power means when said adjuster means is positioned for zero pitch change.

10. In an aeronautical propeller having a hub and blades movably mounted therein for pitch change, said propeller having a fixed portion, an infinitely variable drive ratio close-coupled hydraulic pump-motor unit on said fixed portion, means to drive said pump from said propeller, a transfer gearing drivably connecting said motor with said propeller blades, means for varying the drive ratio of said unit, a blade pitch angle senser on said propeller, linkage connecting said senser with said drive ratio varying means, and a controller for initiating finite pitch angle changes operatively connected to said drive ratio varying means for initiating a pitch change of the propeller, said pitch senser being operative to neutralize said drive ratio varying means when the pitch preset by said controller is reached.

11. In an aeronautical propeller having a hub and blades movably mounted therein for pitch change, said propeller having a fixed portion, an infinitely variable drive ratio close-coupled hydraulic pump-motor unit on said fixed portion, means to drive said pump from said propeller, a transfer gearing drivably connecting said motor with said propeller blades, means for varying the drive ratio of said unit, a controller for operating said drive ratio varying means, adjustable to various rates of pitch change in pitch increasing and pitch decreasing directions, a pitch limit stop in said propeller, means connected to said blades and movable thereby during pitch change and engageable at times with said stop, and means connected to said unit and actuated by engagement of said connected means with said stop to neutralize said drive ratio varying means regardless of the position of said controller.

12. A controllable pitch propeller comprising in combination a hub having blades mounted therein for pitch change, intergearing having a driving portion, normally stationary, and a driven portion, normally rotating with the hub, the latter portion being drivably connected with the blades to change their pitch angle upon rotation of said latter portion relative to the hub, said driving portion being rotatable in either direction to afford rotation of said driven portion relative to the hub, a unitary power unit, fixedly mounted, comprising a fixed displacement hydraulic motor hydraulically connected with and driven by a variable displacement reversible flow pump, the output element of said motor being drivably connected to said driving portion of said intergearing, means drivably connecting said pump to the propeller to drive the pump at a speed proportional to propeller speed, means connected to said pump to adjust the flow rate and direction of hydraulic fluid output from said pump to said motor, auxiliary motor means connected to said intergearing operable selectively and in response to low or nil rotational speed of said propeller to drive said intergearing driving portion, means connected to said auxiliary motor means to hold said auxiliary motor means from rotation when not operating and when said hydraulic motor is in operation, means connected to said hydraulic motor to hold said hydraulic motor from drive by said intergearing when the hydraulic motor is inoperative and when said auxiliary motor means is in operation, a rotating sump secured to said propeller embracing said intergearing and carrying hydraulic fluid for feeding said hydraulic pump and a non-rotating housing mounted on said propeller upon which said hydraulic power unit is secured.

13. A controllable pitch propeller comprising in combination a hub having blades mounted therein for pitch change, intergearing having an output portion connected with said blades and having a driving portion rotatable in either direction respectively to increase and decrease the pitch of said blades, a unitary power unit, fixedly mounted, comprising a fixed displacement hydraulic motor hydraulically connected with and driven by a variable reversible flow hydraulic pump, the output element of said motor being drivably connected with said intergearing driving portion, means drivably connecting said pump to the propeller to drive said pump and at a speed proportional to the speed of rotation of said propeller, means connected to said pump to adjust the flow rate and direction of hydraulic fluid output from said pump to said motor, said motor output element including an irreversible bi-directional driving mechanism allowing drive from said motor to said intergearing driving portion but locking said output element against driving from said intergearing, alternative motor means drivably connected to said intergearing and selectively energizable at propeller speed below a predetermined speed, and means driven by the propeller responsive to propeller speed over said predetermined speed to prevent energization of said alternative motor means.

14. In an aeronautical propeller having a hub and blade movably mounted therein for pitch change, a hydraulic motor connected to said blade to change blade pitch upon motor actuation, a pump on and driven by the propeller hydraulically connected to drive said motor, control means to vary the fluid input from said pump to said motor thus to vary the rate and direction of operation thereof, alternative power means drivably connected to said blades for at times changing blade pitch, means connected to the propeller and operated below a predetermined low rotational speed thereof, and means connecting said latter connected means with said alternative power means and with said control means to initiate operation of the alternative power means upon a call for pitch change below said predetermined low rotational speed of the propeller.

References Cited in the file of this patent

UNITED STATES PATENTS

| Number | Name | Date |
|---|---|---|
| 711,662 | Herdman | Oct. 21, 1902 |
| 1,502,310 | Magie et al. | July 22, 1924 |
| 1,558,003 | Ferris | Oct. 20, 1925 |
| 1,596,511 | Pistolesi | Aug. 17, 1926 |
| 2,086,097 | Shoemaker | July 6, 1937 |
| 2,255,963 | Benedek | Sept. 16, 1941 |
| 2,364,672 | Stevenson | Dec. 12, 1944 |
| 2,370,675 | McCoy | Mar. 6, 1945 |
| 2,378,580 | Prause et al. | June 19, 1945 |
| 2,378,938 | McCoy | June 26, 1945 |
| 2,382,389 | Benedek | Aug. 14, 1945 |
| 2,403,532 | Hoover | July 9, 1946 |
| 2,513,660 | Martin et al. | July 4, 1950 |
| 2,516,200 | Geyer | Jan. 25, 1950 |

FOREIGN PATENTS

| Number | Country | Date |
|---|---|---|
| 522,949 | Great Britain | July 2, 1940 |
| 580,488 | Great Britain | Sept. 10, 1946 |
| 866,262 | France | Apr. 21, 1941 |